US006014620A

United States Patent [19]

[11] Patent Number: 6,014,620
[45] Date of Patent: Jan. 11, 2000

Händel

[54] POWER SPECTRAL DENSITY ESTIMATION METHOD AND APPARATUS USING LPC ANALYSIS

[75] Inventor: Peter Händel, Uppsala, Sweden

[73] Assignee: Telefonaktiebolaget LM Ericsson, Stockholom, Sweden

[21] Appl. No.: 08/987,041

[22] Filed: Dec. 9, 1997

Related U.S. Application Data

[63] Continuation of application No. PCT/SE96/00753, Jun. 7, 1996.

[30] Foreign Application Priority Data

Jun. 21, 1995 [SE] Sweden .................................. 9502261

[51] Int. Cl.[7] .......................................... G01L 3/02
[52] U.S. Cl. .......................................... 704/219
[58] Field of Search .................................. 704/205, 211, 704/216, 217, 218, 219

[56] References Cited

U.S. PATENT DOCUMENTS

| | | | |
|---|---|---|---|
| 4,070,709 | 1/1978 | Roberts et al. | 364/602 |
| 4,901,307 | 2/1990 | Gilhousen et al. | 370/320 |
| 4,941,178 | 7/1990 | Chuang | 704/252 |
| 5,068,597 | 11/1991 | Silverstein et al. | 324/76.19 |
| 5,165,008 | 11/1992 | Hermansky et al. | 704/262 |
| 5,208,862 | 5/1993 | Ozawa . | |
| 5,241,692 | 8/1993 | Harrison et al. | 455/79 |
| 5,251,263 | 10/1993 | Andrea et al. | 381/71.6 |
| 5,272,656 | 12/1993 | Genereux | 364/724.19 |
| 5,327,893 | 7/1994 | Savic | 600/454 |
| 5,351,338 | 9/1994 | Wilgren | 704/219 |
| 5,363,858 | 11/1994 | Farwell | 600/544 |
| 5,467,777 | 11/1995 | Farwell | 600/544 |
| 5,590,242 | 12/1996 | Juang et al. | 704/245 |
| 5,664,052 | 9/1997 | Nishiguchi et al. | 704/214 |
| 5,706,394 | 1/1998 | Wynn | 704/219 |
| 5,732,188 | 3/1998 | Moriya et al. | 704/219 |
| 5,744,742 | 4/1998 | Lindemann et al. | 84/623 |
| 5,774,846 | 6/1998 | Morii | 704/232 |
| 5,787,387 | 7/1998 | Aguilar | 704/208 |
| 5,794,185 | 8/1998 | Bergstrom et al. | 704/223 |
| 5,809,455 | 9/1998 | Nishiguchi et al. | 704/214 |

FOREIGN PATENT DOCUMENTS 0 588 526 3/1994 European Pat. Off. .

OTHER PUBLICATIONS

Deller Jr., et al; "Discrete–Time Processing of Speech Signals", 1993, pp. 501–516.
Boll, S.F., "Suppression of Acoustic noise in Speech Using Spectral Subtraction", IEEE Transactions on Acoustics, Speech and Signal Processing, vol. ASSP–27, pp. 113–120, Apr. 1979.
Lim, J.S. et al., "Enhancement and bandwidth Compression of Noisy Speech", Proceedings of the IEEE, vol. 67, No. 12, pp. 1586–1604, Dec. 1979.
Kay, S.M., "Modern Spectral Estimation: Theory and Application", Prentice Hall, Englewood Cliffs, NJ, pp. 237–240, 1988.
Proakis, J.G. et al., "Advanced Digital Signal Processing", Macmillam Publishing Company, pp. 498–510, 1992.
Proakis, J.G. "Digital Communications", MacGraw Hill, pp. 101–110, 1989.
Handel, P. et al., "Asymptotic Variance of the AR Spectral Estimator for Noisy Sinusoidal Data", Signal Processing, vol. 35, No. 2, pp. 131–139, Jan. 1994.

*Primary Examiner*—David R. Hudspeth
*Assistant Examiner*—Michael N. Opsasnick
*Attorney, Agent, or Firm*—Burns, Doane, Swecker & Mathis, L.L.P.

[57] ABSTRACT

A residual error based compensator for the frequency domain bias of an autoregressive spectral estimator is disclosed. LPC analysis is performed on the residual signal and a parametric PSD estimate is formed with the obtained LPC parameters. The PSD estimate of the residual signal multiplies the PSD estimate of the input signal.

14 Claims, 4 Drawing Sheets

POWER SPECTRAL DENSITY ESTIMATION METHOD AND APPARATUS USING LPC ANALYSIS

This application is a continuation of International Application No. PCT/SE96/00753, filed Jun. 7, 1996, which designates the United States.

TECHNICAL FIELD

The present invention relates to a bias compensated spectral estimation method and apparatus based on a parametric auto-regressive model.

The present invention may be applied, for example, to noise suppression in telephony systems, conventional as well as cellular, where adaptive algorithms are used in order to model and enhance noisy speech based on a single microphone measurement,see Citations [1, 2] in the appendix.

Speech enhancement by spectral subtraction relies on, explicitly or implicitly, accurate power spectral density estimates calculated from the noisy speech. The classical method for obtaining such estimates is periodogram based on the Fast Fourier Transform (FFT). However, lately another approach has been suggested, namely parametric power spectral density estimation, which gives a less distorted speech output, a better reduction of the noise level and remaining noise without annoying artifacts ("musical noise"). For details on parametric power spectral density estimation in general, see Citations [3, 4] in the appendix.

In general, due to model errors, there appears some bias in the spectral valleys of the parametric power spectral density estimate. In the output from a spectral subtraction based noise. canceler this bias gives rise to an undesirable "level pumping" in the background noise.

SUMMARY

An object of the present invention is a method and apparatus that eliminates or reduces this "level pumping" of the background noise with relatively low complexity and without numerical stability problems.

This object is achieved by a method and apparatus in accordance with the enclosed claims.

The key idea of this invention is to use a data dependent (or adaptive) dynamic range expansion for the parametric spectrum model in order to improve the audible speech quality in a spectral subtraction based noise canceler.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings the same reference designations will be used for corresponding or similar elements.

Furthermore, in order to simplify the description of the present invention, the mathematical background of the present invention has been transferred to the enclosed appendix. In the following description numerals within parentheses will refer to corresponding equations in this appendix.

Figure 1:
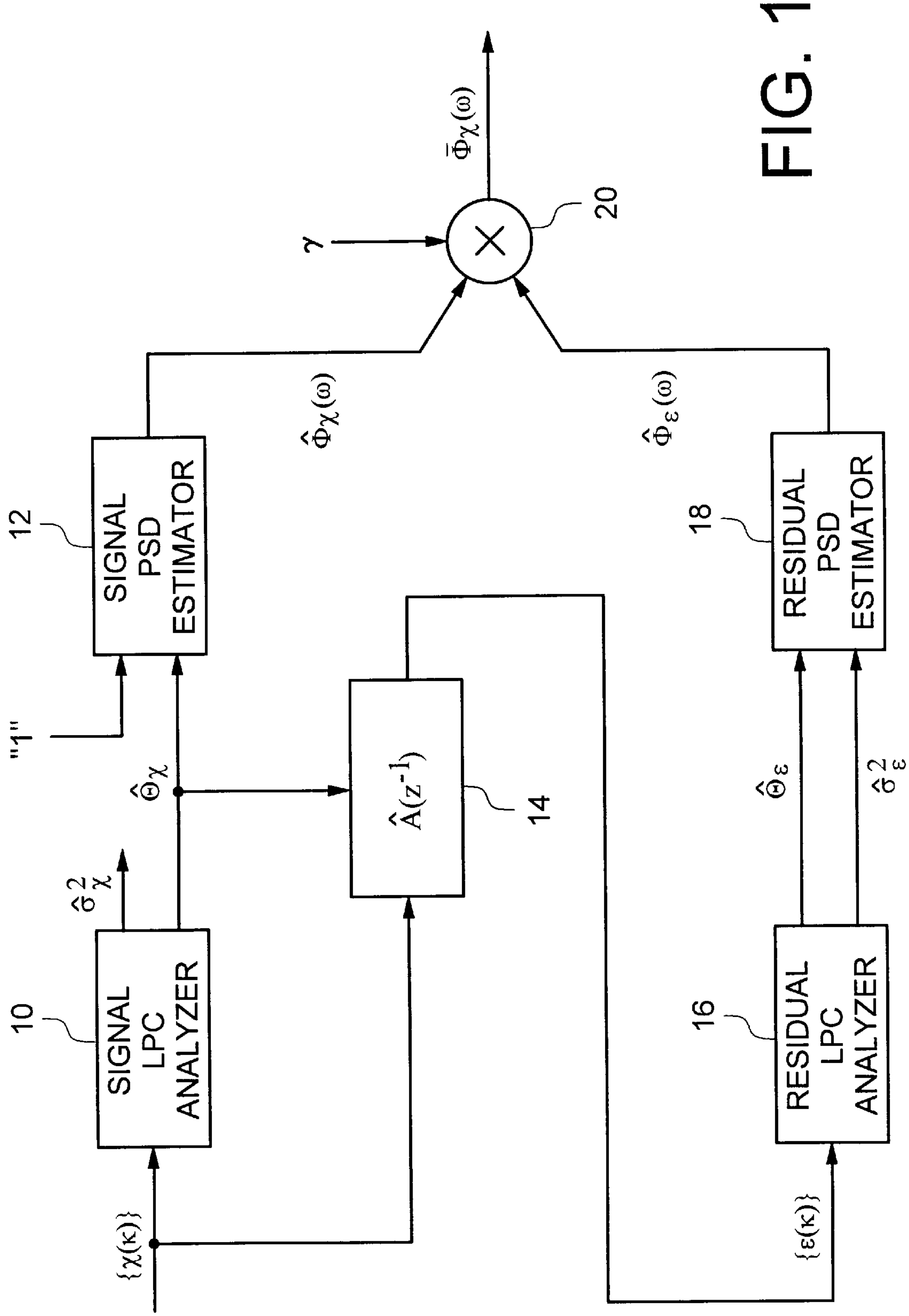
FIG. 1 is a block diagram illustrating an embodiment of an apparatus in accordance with the present invention.

FIG. 1 shows a block diagram of an embodiment of the apparatus in accordance with the present invention. A frame of speech {x(k)} is forwarded to a LPC analyzer (LPC analysis is described in, for example, Citation [5]) in the appendix. LPC analyzer 10 determines a set of filter coefficients (LPC parameters) that are forwarded to a PSD estimator 12 and an inverse filter 14. PSD estimator 12 determines a parametric power spectral density estimate of the input frame {x(k)} from the LPC parameters (see Citation (1) in the appendix). In FIG. 1 the variance of the input signal is not used as an input to PSD estimator 12. Instead a unit signal "1" is forwarded to PSD estimator 12. The reason for this is simply that this variance would only scale the PSD estimate, and since this scaling factor has to be canceled in the final result (see Citation (9) in the appendix), it is simpler to eliminate it from the PSD calculation. The estimate from PSD estimator 12 will contain the "level pumping" bias mentioned above.

In order to compensate for the "level pumping" bias the input frame {x(k)} is also forwarded to inverse filter 14 for forming a residual signal (see Citation (7) in the appendix), which is forwarded to another LPC analyzer 16. LPC analyzer 16 analyses the residual signal and forwards corresponding LPC parameters (variance and filter coefficients) to a residual PSD estimator 18, which forms a parametric power spectral density estimate of the residual signal (see Citation (8) in the appendix).

Finally the two parametric power spectral density estimates of the input signal and residual signal, respectively, are multiplied by each other in a multiplier 20 for obtaining a bias compensated parametric power spectral density estimate of input signal frame {x(k)} (this corresponds to equation (9) in the appendix).

EXAMPLE

The following scenario is considered: The frame length N=1024 and the AR (AR=AutoRegressive) model order p=10. The underlying true system is modeled by the ARMA (ARMA=AutoRegressive-Moving Average) process $$x(k)=\frac{1-z^{-1}+0.9z^{-2}}{1-3.0z^{-1}+4.64z^{-2}-4.44z^{-3}+2.62z^{-4}-0.77z^{-5}}e(k)$$

where e(k) is white noise.

Figure 3:
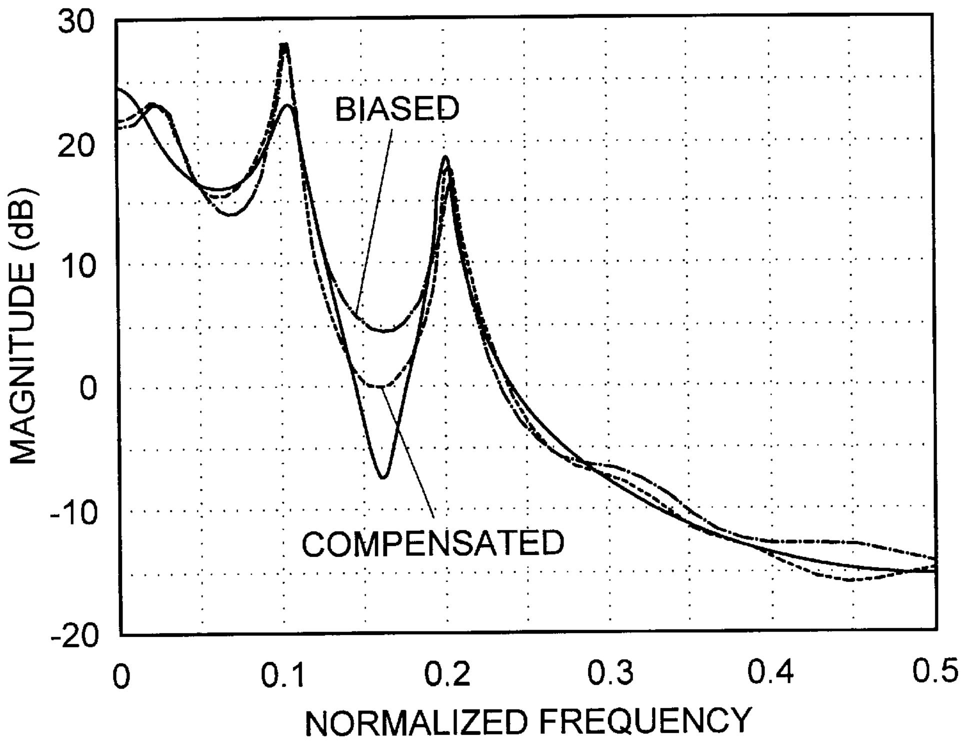
FIG. 3 is a diagram illustrating the true power spectral density, a parametric estimate of the true power spectral density and a bias compensated estimate of the true power spectral density.

FIG. 3 shows the true power spectral density of the above process (solid line), the biased power spectral density estimate from PSD estimator 12 (dash-dotted line) and the bias compensated power spectral density estimate in accordance with the present invention (dashed line). From FIG. 3 it is clear that the bias compensated power spectral density estimate in general is closer to the underlying true power spectral density. Especially in the deep valleys (for example for $\omega/(2\pi)\approx 0.17$) the bias compensated estimate is much closer (by 5 dB) to the true power spectral density.

Figure 4:
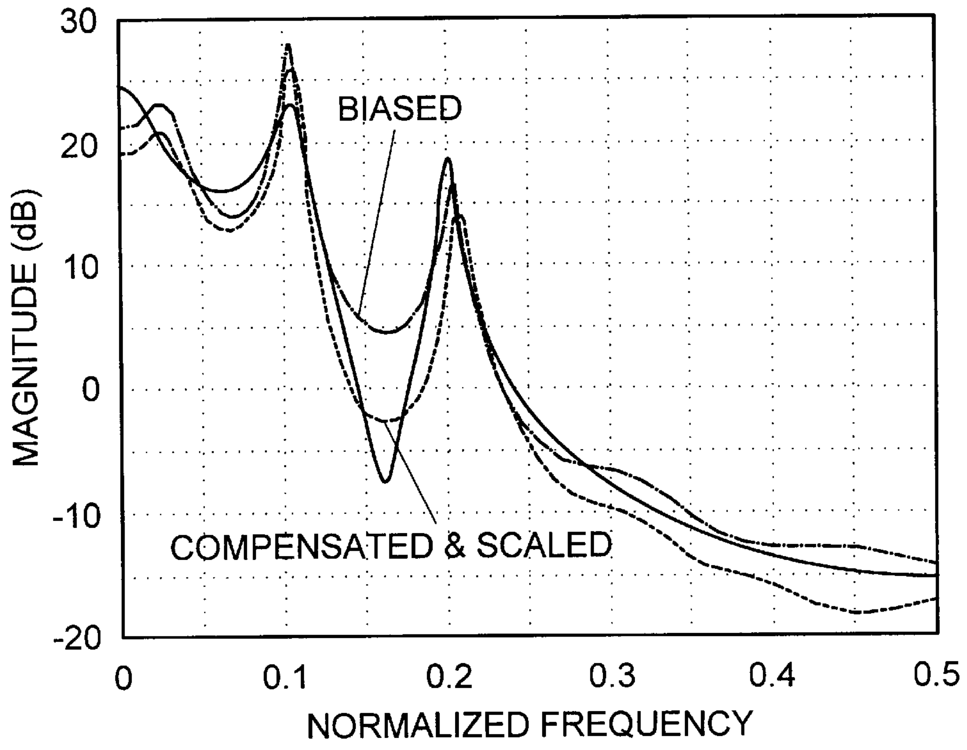
FIG. 4 is another diagram illustrating the true power spectral density, a parametric estimate of the true power spectral density and a bias compensated estimate of the true power spectral density.

In a preferred embodiment of the present invention a design parameter $\gamma$ may be used to multiply the bias compensated estimate. In FIG. 3 parameter $\gamma$ was assumed to be equal to 1. Generally $\gamma$ is a positive number near 1. In the preferred embodiment $\gamma$ has the value indicated in the algorithm section of the appendix. Thus, in this case $\gamma$ differs from frame to frame. FIG. 4 is a diagram similar to the diagram in FIG. 3, in which the bias compensated estimate has been scaled by this value of $\gamma$.

The above described embodiment of FIG. 1 may be characterized as a frequency domain compensation, since the actual compensation is performed in the frequency domain by multiplying two power spectral density estimates with each other. However, such an operation corresponds to convolution in the time domain. Thus, there is an equivalent time domain implementation of the invention. Such an embodiment is shown in FIG. 2.

Figure 2:
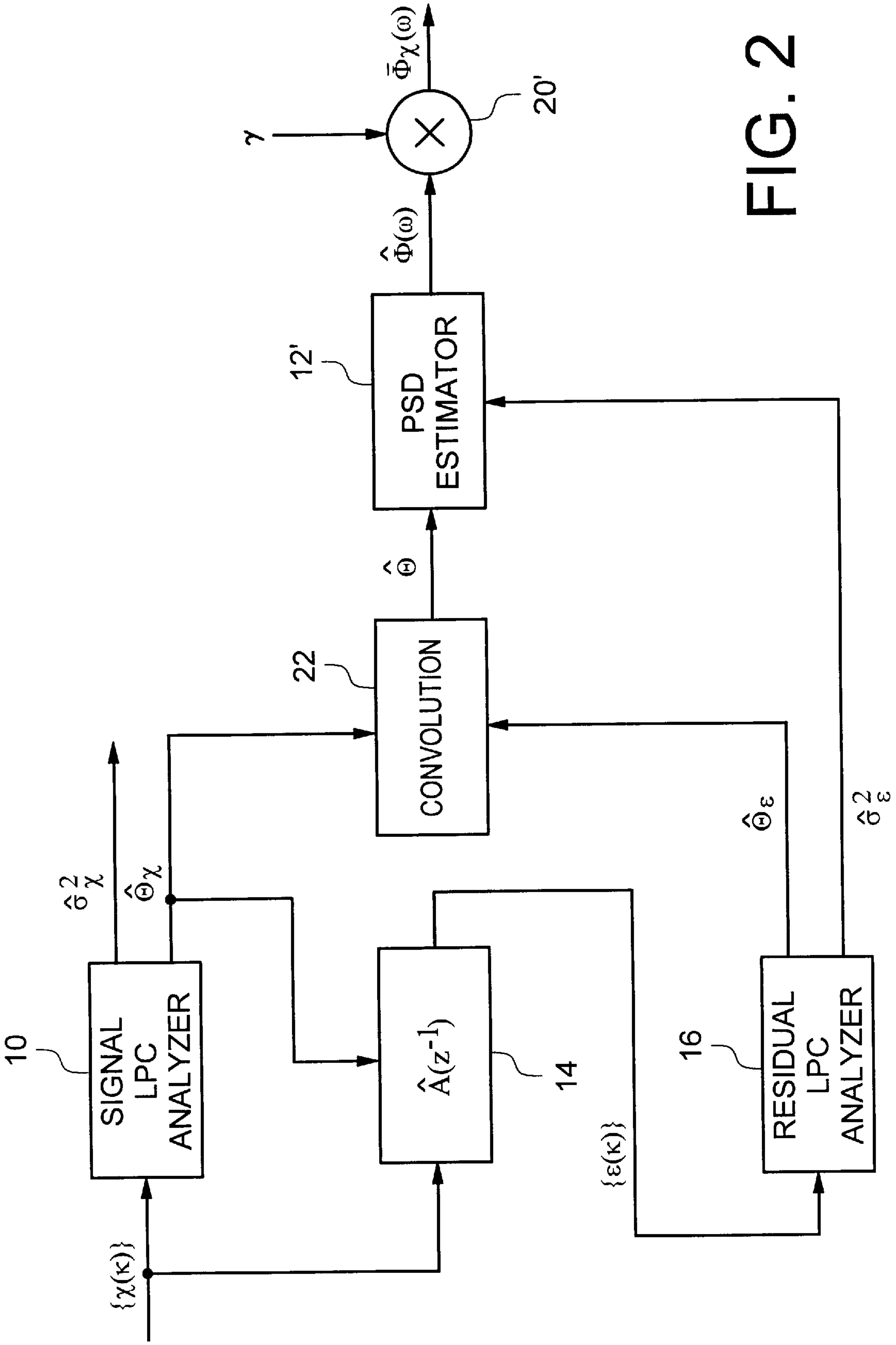
FIG. 2 is a block diagram of another embodiment of an apparatus in accordance with the present invention.

In FIG. 2 the input signal frame is forwarded to LPC analyzer 10 as in FIG. 1. However, no power spectral density estimation is performed with the obtained LPC parameters. Instead the filter parameters from LPC analysis of the input signal and residual signal are forwarded to a convolution circuit 22, which forwards the convoluted parameters to a PSD estimator 12', which forms the bias compensated estimate, which may be multiplied by $\gamma$. The convolution step may be viewed as a polynomial multiplication, in which a polynomial defined by the filter parameters of the input signal is multiplied by the polynomial defined by the filter parameters of the residual signal. The coefficients of the resulting polynomial represent the bias compensated LPC-parameters. The polynomial multiplication will result in a polynomial of higher order, that is, in more coefficients. However, this is no problem, since it is customary to "zero pad" the input to a PSD estimator to obtain a sufficient number of samples of the PSD estimate. The result of the higher degree of the polynomial obtained by the convolution will only be fewer zeroes.

Figure 5:
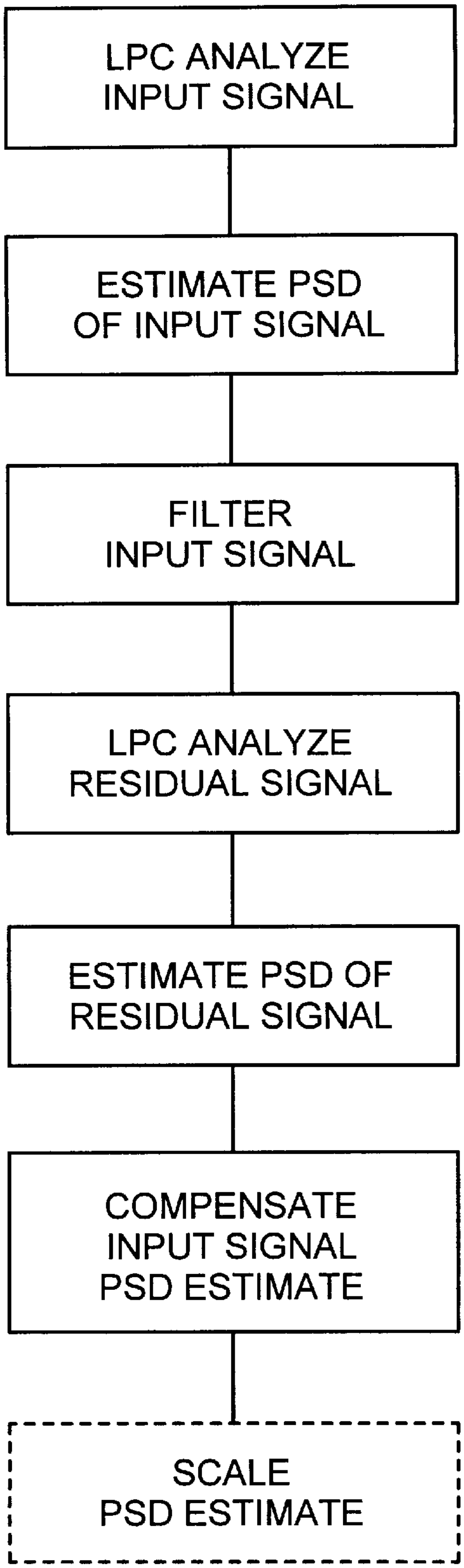
FIG. 5 is a flow chart illustrating the method performed by the embodiment of FIG. 1.
Figure 6:
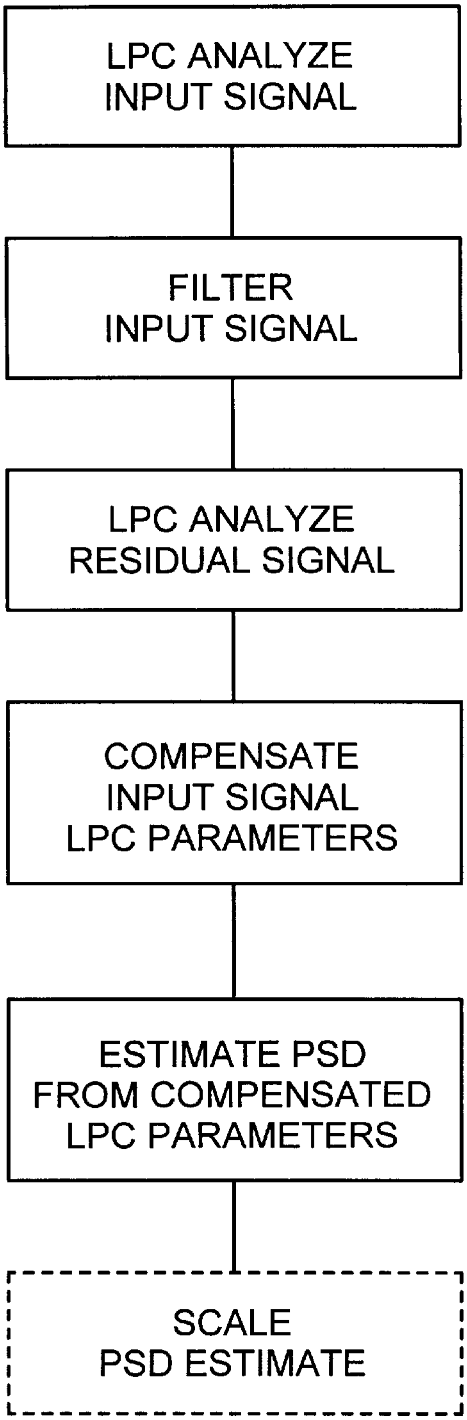
FIG. 6 is a flow chart illustrating the method performed by the embodiment of FIG. 2.

Flow charts corresponding to the embodiments of FIGS. 1 and 2 are given in FIGS. 5 and 6, respectively. Furthermore, the corresponding frequency and time domain algorithms are given in the appendix.

A rough estimation of the numerical complexity may be obtained as follows. The residual filtering (7) requires $\approx$Np operations (sum+add). The LPC analysis of e(k) requires $\approx$Np operations to form the covariance elements and $\approx p^2$ operations to solve the corresponding set of equations (3). Of the algorithms (frequency and time domain) the time domain algorithm is the most efficient, since it requires $\approx p^2$ operation for performing the convolution. To summarize, the bias compensation can be performed in $\approx$p (N+p) operations/frame. For example, with n=256 and p=10 and 50% frame overlap, the bias compensation algorithm requires approximately $0.5\times10^6$ instructions/s.

In this specification the invention has been described with reference to speech signals. However, the same idea is also applicable in other applications that rely on parametric spectral estimation of measured signals. Such applications can be found, for example, in the areas of radar and sonar, economics, optical interferometry, biomedicine, vibration analysis, image processing, radio astronomy, oceanography, etc.

It will be understood by those skilled in the art that various modifications and changes may be made to the present invention without departure from the spirit and scope thereof, which is defined by the appended claims.

CITATIONS

[1] S. F. Boll, "Suppression of Acoustic Noise in Speech Using Spectral subtraction", IEEE Transactions on Acoustics, Speech and Signal Processing, Vol. ASSP-27, April 1979, pp 113–120.

[2] J. S. Lim and A. V. Oppenheim, "Enhancement and Bandwidth Compression of Noisy Speech", Proceedings of the IEEE, Vol. 67, No. 12, December 1979, pp. 1586–1604.

[3] S. M. Kay, Modern Spectral estimation: Theory and Application, Prentice Hall, Englewood Cliffs, N.J., 1988, pp 237–240.

[4] J. G. Proakis et al, Advanced Digital Signal Processing, Macmillam Publishing Company, 1992, pp. 498–510.

[5] J. G. Proakis, Digital Communications, MacGraw Hill, 1989, pp. 101–110.

[6] P. Händel et al, "Asymptotic variance of the AR spectral estimator for noisy sinusoidal data", Signal Processing, Vol. 35, No. 2, January 1994, pp. 131–139.

APPENDIX

Consider the real-valued zero mean signal {x(k)}, k=1 . . . , N where N denotes the frame length (N=160, for example). The autoregressive spectral estimator (ARSPE) is given by, see |3, 4|

$$\hat{\Phi}_x(\omega) = \frac{\hat{\sigma}_x^2}{\left|\hat{A}(e^{i\omega})\right|^2} \tag{1}$$

where ω is the angular frequency $\omega\epsilon(0, 2\pi)$. In (I), Â(x) is given by $$\hat{A}(x)=1+\hat{a}_1 z+\ldots+\hat{a}_p x^p \tag{2}$$

where $\hat{\theta}_x=(\hat{a}_1 \ldots \hat{a}_p)^T$ are the estimated AR coefficients (found by LPC analysis, see |5|) and $\hat{\sigma}_x^2$ is the residual error variance. The estimated parameter vector $\hat{\theta}_x$ and $\hat{\sigma}_x^2$ are calculated from {x(k)} as follows:

$$\hat{\theta}_x=-\hat{R}^{-1}\hat{r}$$

$$\hat{\sigma}_x^2=\hat{r}_0+\hat{r}^T\hat{\theta}_x \tag{3}$$

where $$\hat{R} = \begin{pmatrix} \hat{r}_0 & \cdots & \hat{r}_{p-1} \\ \vdots & \cdot^{\cdot^{\cdot}} & \vdots \\ \hat{r}_{p-1} & \cdots & \hat{r}_0 \end{pmatrix} \quad r = \begin{pmatrix} \hat{r}_1 \\ \vdots \\ \hat{r}_p \end{pmatrix} \tag{4}$$

and, where $$\hat{r}_k = \frac{1}{N}\sum_{t=1}^{N-k} x(t+k)x(t) \quad \hat{r}_{-k} = \hat{r}_k \quad k = 0, \ldots, p \tag{5}$$

The set of linear equations (3) can be solved using the Levinson-Durbin algorithm, see |3|. The spectral estimate (1) is known to be smooth and its statistical properties have been analyzed in |6| for broad-band and noisy narrow-band signals, respectively.

In general, due to model errors there appears some bias in the spectral valleys. Roughly, this bias can be described as $$\hat{\Phi}_x(\omega)-\Phi_x(\omega)\begin{cases}\approx 0 & \text{for } \omega \text{ such that } \Phi_x(\omega)\approx \max_\omega \Phi_x(\omega)\\ \gg 0 & \text{for } \omega \text{ such that } \Phi_x(\omega)\ll \max_\omega \Phi_x(\omega)\end{cases} \quad (6)$$

where $\hat{\Phi}_x(\omega)$ is the estimate (1) and $\Phi_x(\omega)$ is the true (and unknown) power spectral density of x(k).

In order to reduce the bias appearing in the spectral valleys, the residual is calculated according to $$\epsilon(k)=\hat{A}(x^{-1})x(k)k=1 \ldots N \quad (7)$$

Performing another LPC analysis on $\{\epsilon(k)\}$, the residual power spectral density can be calculated from. cf. (1)

$$\hat{\Phi}_\epsilon(\omega)=\frac{\hat{\sigma}_\epsilon^2}{\left|\hat{B}(e^{i\omega})\right|^2} \quad (8)$$

where similarly to (2), $\hat{\theta}_\epsilon=(\hat{b}_1 \ldots \hat{b}_q)^T$ denotes the estimated AR coefficients and $\hat{\sigma}_\epsilon^2$ the error variance. In general, the model order q≠p, but here it seems reasonable to let p=q. Preferably $p\approx\sqrt{N}$, for example N may be chosen around 10.

In the proposed frequency domain algorithm below, the estimate (1) is compensated according to $$\overline{\Phi}_x(\omega)=\frac{\gamma}{\hat{\sigma}_x^2}\cdot\hat{\Phi}_\epsilon(\omega)\cdot\hat{\Phi}_x(\omega) \quad (9)$$

where $\gamma(\approx 1)$ is a design variable. The frequency domain algorithm is summarized in the algorithms section below and in the block diagrams in FIGS. 1 and 5.

A corresponding time domain algorithm is also summarized in the algorithms section and in FIGS. 2 and 6. In this case the compensation is performed in a convolution step, in which the LPC filter coefficients $\hat{\theta}_x$ are compensated. This embodiment is more efficient, since one PSD estimation is replaced by a less complex convolution. In this embodiment the scaling factor γ may simply be set to a constant near or equal to 1. However, it is also possible to calculate γ for each frame, as in the frequency domain algorithm by calculating the root of the characteristic polynomial defined by $\hat{\theta}_\epsilon$ that lies closest to the unit circle. If the angle of this root is denoted $\overline{\omega}$, then $$\max_k \hat{\Phi}_\epsilon(k)=\frac{\hat{\sigma}_\epsilon^2}{\left|\hat{B}(e^{i\overline{\omega}})\right|^2}$$

ALGORITHMS

Inputs x input data $x=(x(1) \ldots x(N))^T$ p LPC model order

Outputs $\hat{\theta}_x$ signal LPC parameters $\hat{\theta}_x=(\hat{a}_1 \ldots \hat{a}_p)^T$ $\hat{\sigma}_x^2$ signal LPC residual variance $\hat{\Phi}_x$ signal LPC spectrum $\hat{\Phi}_x=(\hat{\Phi}_x(1) \ldots \hat{\Phi}_x(N/2))^T$ $\overline{\Phi}_x$ compensated LPC spectrum $\overline{\Phi}_x=(\overline{\Phi}_x(1) \ldots \overline{\Phi}_x(N/2))^T$ $\epsilon$residual $\epsilon=(\epsilon(1) \ldots \epsilon(N))^T$ $\hat{\theta}$residual LPC parameters $\hat{\theta}_\epsilon=(\hat{b}_1 \ldots \hat{b}_p)^T$ $\hat{\sigma}_\epsilon^2$ residual LPC error variance γ design variable ($=1/(\max_k\hat{\Phi}_\epsilon(k))$ in preferred embodiment)

FREQUENCY DOMAIN ALGORITHM

For Each Frame Do the Following Steps

| power spectral density estimation | |
|---|---|
| $[\hat{\theta}_x, \hat{\sigma}_x^2]$ := LP Canalyze(x,p) | signal LPC analysis |
| $\hat{\phi}_x$ := SPEC($\hat{\theta}_x$, 1. N) | signal spectral estimation, $\hat{\sigma}_x^2$ set to 1 (bias compensation) |
| $\epsilon$ := FILTER($\hat{\theta}_x$, x) | residual filtering |
| $[\hat{\theta}_\epsilon, \hat{\sigma}_\epsilon^2]$ := LPCanalyze( $\epsilon$, p) | residual LPC analysis |
| $\hat{\Phi}_\epsilon$ := SPEC($\hat{\theta}_\epsilon$, $\hat{\sigma}_\epsilon^2$, N) | residual spectral estimation |
| FOR k=1 TO N/2 DO | spectral compensation |
| $\hat{\Phi}_x(k) := \gamma \cdot \hat{\Phi}_x(k) \cdot \hat{\Phi}_\epsilon(k)$ | $1/\max_k\hat{\Phi}_\epsilon(k)) \leqq \gamma \leqq 1$ |
| END FOR | |

FREQUENCY DOMAIN ALGORITHM

For Each Frame Do the Following Steps

| | |
|---|---|
| $[\hat{\theta}_x, \hat{\sigma}_x^2]$ := LPCanalyze(x, p) | signal LPC analysis |
| $\epsilon$ := FILTER($\hat{\theta}_x$, x) | residual filtering |
| $[\hat{\theta}_\epsilon, \hat{\sigma}_\epsilon^2]$ := LPCanalyze($\epsilon$, p) | residual LPC analysis |
| $\hat{\theta}$ :=CONV($\hat{\theta}_x$,$\hat{\theta}_\epsilon$) | LPC compensation |
| $\hat{\Phi}$ := SPEC($\hat{\theta}$, $\hat{\sigma}_\epsilon^2$, N) | spectral estimation |
| FOR k=1 TO N/2 DO | scaling |
| $\hat{\Phi}_x(k) := \gamma \cdot \hat{\Phi}(k)$ | |
| END FOR | |

What is claimed is:

1. A power spectral density estimation method, comprising the steps of:

performing a LPC analysis on a sampled input signal vector for determining a first set of LPC filter parameters;

determining a first power spectral density estimate of said sampled input signal vector based on said first set of LPC filter parameters;

filtering said sampled input signal vector through an inverse LPC filter determined by said first set of LPC filter parameters for obtaining a residual signal vector;

performing a LPC analysis on said residual signal vector for determining a second set of LPC filter parameters;

determining a second power spectral density estimate of said residual signal vector based on said second set of LPC filter parameters; and forming a bias compensated power spectral estimate of said sampled input signal vector that is proportional to the product of said first and second power spectral estimates.

2. The method of claim 1, wherein said product is multiplied by a positive scaling factor that is less than or equal to 1.

3. The method of claim 2, wherein said scaling factor is the inverted value of the maximum value of said second power spectral density estimate.

4. The method of claim 1, wherein said sampled input signal vector comprises speech samples.

5. A power spectral density estimation method, comprising the steps of:

performing a LPC analysis on a sampled input signal vector for determining a first set of LPC filter parameters;

filtering said sampled input signal vector through an inverse LPC filter determined by said first set of LPC filter parameters for obtaining a residual signal vector;

performing a LPC analysis on said residual signal vector for determining a second set of LPC filter parameters;

convolving said first set of LPC filter parameters with said second set of LPC filter parameters for forming a compensated set of LPC filter parameters;

determining a bias compensated power spectral density estimate of said sampled input signal vector based on said compensated set of LPC filter parameters.

6. The method of claim 5, wherein said bias compensated power spectral density estimate is multiplied by a positive scaling factor that is less than or equal to 1.

7. The method of claim 6, wherein said scaling factor is the inverted value of the maximum value of a power spectral density estimate of said residual signal vector.

8. The method of claim 5, wherein said sampled input signal vector comprises speech samples.

9. A power spectral density estimation apparatus, comprising:

means for performing a LPC analysis on a sampled input signal vector for determining a first set of LPC parameters;

means for determining a first power spectral density estimate of said sampled input signal vector based on said first set of LPC parameters;

means for filtering said sampled input signal vector through an inverse LPC filter determined by said first set of LPC parameters for obtaining a residual signal vector;

means for performing a LPC analysis on said residual signal vector for determining a second set of LPC parameters;

means for determining a second power spectral density estimate of said residual signal vector based on said second set of LPC parameters; and means for forming a bias compensated power spectral estimate of said sampled input signal vector that is proportional to the product of said first and second power spectral estimates.

10. A power spectral density estimation apparatus, comprising:

means for performing a LPC analysis on a sampled input signal vector for determining a first set of LPC filter parameters;

means for filtering said sampled input signal vector through an inverse LPC filter determined by said first set of LPC filter parameters for obtaining a residual signal vector;

means for performing a LPC analysis on said residual signal vector for determining a second set of LPC filter parameters;

means for convolving said first set of LPC filter parameters with said second set of LPC filter parameters for forming a compensated set of LPC filter parameters;

means for determining a bias compensated power spectral density estimate of said sampled input signal vector based on said compensated set of LPC filter parameters.

11. The method of claim 2, wherein said input signal vector comprises speech samples.

12. The method of claim 3, wherein said input signal vector comprises speech samples.

13. The method of claim 6, wherein said input signal vector comprises speech samples.

14. The method of claim 7, wherein said input signal vector comprises speech samples.

* * * * *